United States Patent
Hayden et al.

(10) Patent No.: US 9,555,588 B2
(45) Date of Patent: Jan. 31, 2017

(54) INSERT FOR FORMING AN END CONNECTION IN A UNI-AXIAL COMPOSITE MATERIAL

(75) Inventors: Paul Trevor Hayden, Cowes (GB); David Anthony Whiley, Shrewsbury (GB); Peter Anthony Broome, Cowes (GB)

(73) Assignee: General Electric Company, Schenectady, NY (US)

( * ) Notice: Subject to any disclaimer, the term of this patent is extended or adjusted under 35 U.S.C. 154(b) by 1535 days.

(21) Appl. No.: 12/263,966

(22) Filed: Nov. 3, 2008

(65) Prior Publication Data
US 2010/0084079 A1    Apr. 8, 2010

(30) Foreign Application Priority Data

Oct. 8, 2008 (GB) .................................. 0818467.3

(51) Int. Cl.
*B29C 70/16*    (2006.01)
*B29C 70/86*    (2006.01)
*B29C 70/22*    (2006.01)
*B29C 70/54*    (2006.01)
*B29D 1/00*    (2006.01)
(Continued)

(52) U.S. Cl.
CPC .............. *B29C 70/86* (2013.01); *B29C 70/16* (2013.01); *B29C 70/222* (2013.01); *B29C 70/545* (2013.01); *B29D 1/005* (2013.01); *B29D 99/0025* (2013.01); *F03D 1/0658* (2013.01); *B29C 53/305* (2013.01); *B29C 70/48* (2013.01); *B29L 2031/08* (2013.01); *F05B 2280/6003* (2013.01); *F05B 2280/6013* (2013.01); *F05C 2253/04* (2013.01); *F05C 2253/16* (2013.01);
(Continued)

(58) Field of Classification Search
USPC ......... 403/292, 296, 404; 156/169; 411/900, 411/904, 908
See application file for complete search history.

(56) References Cited

U.S. PATENT DOCUMENTS 2,710,026 A    6/1955    Stewart et al.
2,943,967 A *  7/1960    Simon ........................... 156/171
(Continued)

FOREIGN PATENT DOCUMENTS

DE    3640208    4/1987
DE    3839835    6/1989
(Continued)

OTHER PUBLICATIONS

EPO Machine Translation. gb.espacenet.com. FR 2 863 321.*
(Continued)

*Primary Examiner* — Michael P Ferguson
(74) *Attorney, Agent, or Firm* — Dority & Manning, P.A.

(57) ABSTRACT

An insert for forming an end connection in a uni-axial composite material, and an end connection comprising at least one insert, is disclosed. The insert comprises a sleeve which comprises a plurality of fibers having a multi-axial arrangement. At least a portion of the interior surface of the sleeve comprises a thread formation. A method of forming an end connection in a uni-axial composite material is also disclosed. The method comprises providing a sleeve comprising a plurality of fibers having a multi-axial arrangement and providing a thread formation on at least a portion of the interior surface of the sleeve. The sleeve is positioned and secured within the uni-axial composite material.

28 Claims, 6 Drawing Sheets

(51) Int. Cl.
*B29D 99/00* (2010.01)
*F03D 1/06* (2006.01)
B29C 53/30 (2006.01)
B29C 70/48 (2006.01)
B29L 31/08 (2006.01)

(52) U.S. Cl.
CPC ............ *Y02E 10/721* (2013.01); *Y02P 70/523* (2015.11); *Y10T 156/1064* (2015.01)

(56) References Cited

U.S. PATENT DOCUMENTS

| | | | | |
|---|---|---|---|---|
| 3,283,050 A | * | 11/1966 | Boggs ............................ | 411/900 |
| 3,495,494 A | * | 2/1970 | Scott ............................ | 411/908 |
| 3,713,932 A | * | 1/1973 | Butzow et al. ............... | 156/173 |
| 4,063,838 A | * | 12/1977 | Michael ........................ | 411/908 |
| 4,717,302 A | * | 1/1988 | Adams et al. ................ | 411/903 |
| 5,080,547 A | * | 1/1992 | Moghe .......................... | 411/908 |
| 5,314,282 A | * | 5/1994 | Murphy et al. ............... | 411/908 |
| 2009/0011247 A1 | | 1/2009 | Barlow et al. | |

FOREIGN PATENT DOCUMENTS

| | | |
|---|---|---|
| DE | 19544804 | 6/1997 |
| DE | 101 25 479 | 11/2002 |
| DE | 20320626 | 2/2005 |
| FR | 2863321 | 6/2005 |

OTHER PUBLICATIONS

GB Search Report from Application No. GB0818467.3 dated Feb. 13, 2009.
PCT Search Report for International Application No. PCT/GB2009/002397 dated Mar. 26, 2010.

* cited by examiner

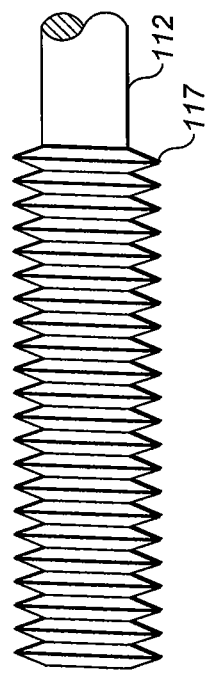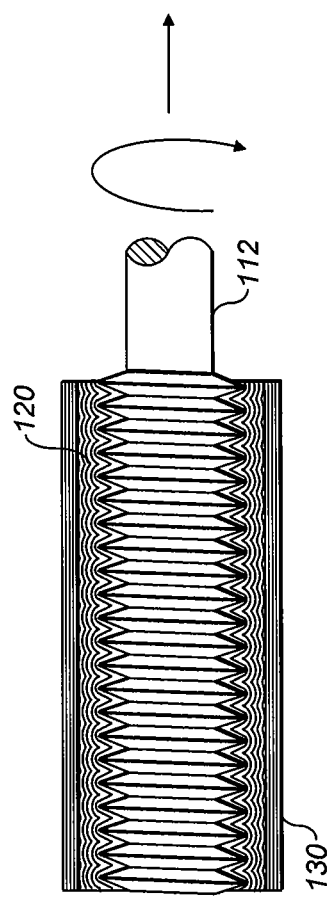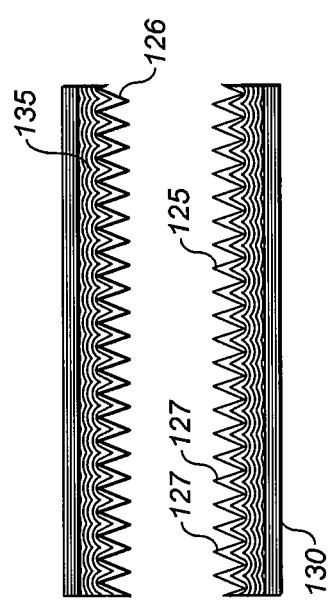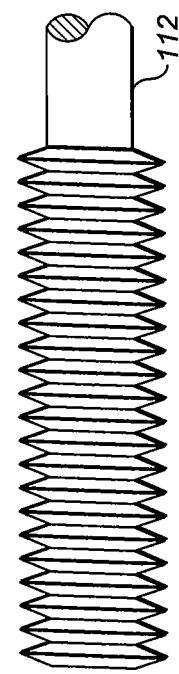
FIG. 4a    FIG. 4b    FIG. 4c

US 9,555,588 B2

INSERT FOR FORMING AN END CONNECTION IN A UNI-AXIAL COMPOSITE MATERIAL

CROSS-REFERENCE TO RELATED APPLICATIONS

This application claims benefit of British patent application number 0818467.3, filed Oct. 8, 2008, which is herein incorporated by reference.

BACKGROUND OF THE INVENTION

Field of the Invention

The present invention relates to an insert for forming a high load carrying end connection in a uni-axial composite material. The present invention also relates to a method of forming an end connection in a uni-axial composite material using the insert. The present invention is exemplified by an insert for a root end of a wind turbine blade. However, the insert is also suitable for use in other applications and with other materials.

Description of the Related Art

In large horizontal axis wind turbines the wind turbine blades are connected to the rotor hub by a number of bolt attachment points. The hub end of the wind turbine blades (the root) is cylindrical in section and typically has a diameter of 1500 mm to 3000 mm. Approximately 60 to 80 bolts connect the blade to a radial pitch bearing within the rotor hub. The bolts are typically M30 to M40 size and each is required to withstand a pullout force of the order of 200 to 400 kN. The bolts are arranged circumferentially around the root.

The female part of the connection must be located in the root part of the blade so that the male bolts can be accessed for maintenance from the hub side when in service to ensure that there is no failure in the connection.

The root of the blade is typically manufactured from fibre reinforced plastic, typically glass fibre in epoxy, vinylester or polyester resin. The predominant fibre orientation in the root structure is uni-axial with the fibres running parallel to the axis of the blade/root cylinder, with very few fibres in the radial direction. The uni-axial orientation of fibres in the root structure presents a problem for the formation of the female part of the hub connection. This is because, if a female thread is cut directly into the "end grain" type uni-axial laminate of the root, the fibres will be cut resulting in a low pull out strength equal only to the shear strength of the resin. This is illustrated in FIG. 1 which shows that the uni-axial threads have been cut in the vicinity of the female thread such that only the resin provides structural integrity to the thread formation.

To overcome this problem long metallic female threaded inserts have been used. The metallic inserts are designed provide a large bond area so that, when the inserts are bonded into the uni-axial composite structure of the root, a bond having a sufficient pull out strength is achieved. The male bolts thread into the female threaded inserts to form the connection.

The metallic inserts are either added after the composite root structure has been cured, or when the root structure is being laminated/infused. In the first method, holes for the inserts are drilled into the root and the inserts are then bonded into position. This method requires specialist adhesive and equipment. In the alternative method, the inserts are placed into the uncured laminate during "lay-up" and are then cured into the structure when the root composite is cured.

Although the use of metallic inserts solves the problem of cutting female threads directly into the uni-axial "end grain" of the root structure, they have their own problems. For example, structural problems can be caused by the thermal mismatch between the metallic inserts and the surrounding composite material, which have different thermal expansion coefficients. In addition, the metallic inserts have a higher stiffness than the surrounding composite material leading to problems with flexural mismatch in service.

One way of countering these problems is to provide the metallic inserts with a tapered, more flexible, (sometimes referred to as carrot shaped) configuration to minimise the effect of material stiffness mismatch. In addition, the composite laminate in the region of the connection is made very thick, and hence stiffer, to further reduce the effect of the material stiffness mismatch. A typical schematic example of a prior art metallic insert 1 embedded in a uni-axial composite material 2 is shown in FIG. 2. In practice approximately one third of the length of the insert is tapered. The taper of the inserts used in the current art can also be made by tapering down the amount of metallic material on the inside of the insert.

As wind turbines have got larger, the extra composite material required at the root end to compensate for the structural mismatch between the metallic inserts and the composite laminate has become very significant. The additional material contributes greatly to the overall mass, and hence cost, of the blade. For a 40 m wind blade, the wall thickness of the composite laminate at the root end is in the order of 80 mm and, for a 350 mm metallic insert, the wall thickness must be maintained for approximately 500 mm before it can begin to reduce. Because of the need for large amounts of composite material in the root structure, the cost of using more expensive materials, such as carbon fibre composite as required for larger blades, becomes prohibitive.

SUMMARY OF THE INVENTION

According to a first aspect of the present invention there is provided an insert for forming an end connection in a uni-axial composite material comprising a sleeve, wherein the sleeve comprises a plurality of fibres having a multi-axial arrangement, wherein at least a portion of the interior surface of the sleeve comprises a thread formation.

The insert of the present invention is similar in thermal and mechanical properties to the composite material of the root of a wind blade. There is therefore significantly less mismatch between the thermal and mechanical behaviour of the insert with respect to the root than with prior art metallic inserts. This allows shorter inserts to be used, typically 160 mm rather than 350 mm for a 40 m wind blade, and allows the root to have a smaller wall thickness. This can be a reduction from a wall thickness of about 80 mm to approximately 60 mm. In addition, because a better bond can be achieved between the like materials of the root and the insert, less inserts/bolts need to be used in the connection to the rotor hub leading to savings in material cost and maintenance costs. For a 40 m wind blade, a weight saving of approximately 50% can be achieved in the root by using inserts according to the present invention.

In one preferred example the sleeve comprises one or more layers of multi-axial fibre fabric. This allows for more varied fibre lay-up configurations, thus providing more design freedom. The sleeve may further comprise one or more helically wound fibre layers to provide further design freedom.

Preferably the or each helically wound fibre layer overlies a layer of multi-axial fibre fabric. This has been found to provide a robust structure. The fibres of the or each helically wound fibre layer are preferably substantially aligned with a path described by the crests of the thread formation to provide additional strength in the threads of the insert.

In an alternative example the sleeve comprises a fibre reinforced plastic. Preferably, the sleeve comprises a filament wound fibre composite tube which can be readily purchased. Preferably the winding angle of 90% of the fibres is substantially equal to ±θ, where θ is the thread angle of the thread formation. The inventor has surprisingly found that this fibre arrangement enhances the pull out strength of threads subsequently cut into the tube.

The fibres are preferably embedded within a cured resin matrix so that the insert can be provided as a stand alone component.

In one example the thread formation is integrally formed with the sleeve. This is advantageous as none of the fibres of the sleeve need to be cut to form the thread, thus providing a thread with greater structural integrity. Alternatively the thread formation may be a cut thread formation for ease of manufacture. The inventor has surprisingly found that when a thread formation is cut into a sleeve having a multi-axial fibre arrangement the threads have sufficient pull out strength for wind turbine root connection applications.

The insert may be located on a threaded mandrel.

The insert preferably comprises a helical thread insert located within the thread formation to facilitate reusability of the insert.

In a second aspect the present invention provides an end connection comprising at least one insert according to the first aspect of the present invention embedded within a uni-axial composite material. Preferably the end connection comprises a plurality of inserts according to the first aspect of the present invention embedded within a uni-axial composite material.

In a third aspect the present invention provides a wind turbine blade comprising at least one insert according to the first aspect of the present invention embedded within a root of the wind turbine blade.

According to a fourth aspect of the present invention there is provided a method of forming an end connection in a uni-axial composite material comprising: providing a sleeve comprising a plurality of fibres having a multi-axial arrangement; providing a thread formation on at least a portion of the interior surface of the sleeve; and positioning and securing the sleeve within the uni-axial composite material.

In a preferred example, providing the sleeve comprises fabricating the sleeve on a threaded mandrel to integrally form the thread formation with the sleeve.

Fabricating the sleeve preferably comprises positioning one or more layers of multi-axial fibre fabric on the threaded mandrel. The method may further comprise winding one or more helically wound fibre layers on at least one of the multi-axial fibre fabric layers. Preferably a helically wound fibre layer is wound on each multi-axial fibre fabric layer.

The or each helically wound fibre layer is preferably wound onto the mandrel so that the fibres are substantially aligned with a path described by the crests of the thread formation on the interior surface of the sleeve.

The method may also further comprise impregnating the sleeve with resin and curing the resin to form a fibre reinforced plastic sleeve.

In an alternative example, the sleeve is a fibre reinforced plastic, preferably a filament wound fibre composite tube, and providing the thread formation comprises cutting a thread into the filament wound fibre composite tube.

Positioning and securing the sleeve preferably comprises: cutting a hole in the uni-axial composite material; positioning the sleeve within the hole; and securing the sleeve in the hole with an adhesive. A typical adhesive would be an epoxy adhesive with a shear strength in the range of 25-40 MPa.

In an alternative example, positioning and securing the sleeve comprises: positioning the sleeve within uni-axial material as the uni-axial material is being laid-up; impregnating the uni-axial material with resin; and curing the resin.

In one example, the sleeve and the uni-axial material are impregnated with resin during the same process step. This has the advantage of securing the insert within the uni-axial material so that it becomes an integral part of the finished material.

The sleeve may preferably be located on a mandrel during the positioning and securing. This provides support for the insert during the installation step.

Preferably the sleeve is positioned within the uni-axial composite material such that the major axis of the sleeve is substantially parallel to the uni-axial fibres of the uni-axial composite material.

The method preferably further comprises positioning a helical thread insert in the thread formation to facilitate reusability of the insert.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4a is a schematic drawing of a threaded mandrel;

FIG. 4b shows the threaded mandrel of FIG. 4a with a cross-sectional schematic representation an insert according to the present invention during fabrication;

FIG. 4c shows a cross-sectional schematic drawing of the insert of FIG. 4b when removed from the threaded mandrel;

FIG. 5b is a drawing of the second stage of fabrication of the insert of FIG. 5a;

FIG. 5c is a drawing of the later stages of fabrication of the insert of FIG. 5a;

FIG. 5d is a drawing of the completed insert of FIG. 5a;

FIGS. 3a to 3c schematically illustrate a first method of fabricating an insert according to the present invention. FIG. 3a shows a filament wound fibre composite tube 10 and a thread cutting tool 12. The winding angle of the majority of the fibres 20 of the tube 10 is approximately equal to ±θ (±5E), where θ is the thread angle of the thread cutting tool 12. Ideally, the filament wound fibre composite tube 10 has 90% of its fibres wound at ±θ. However, a tube having between 75% to 95% of its fibres wound at ±θ may also be used.

DETAILED DESCRIPTION

Figure 1:
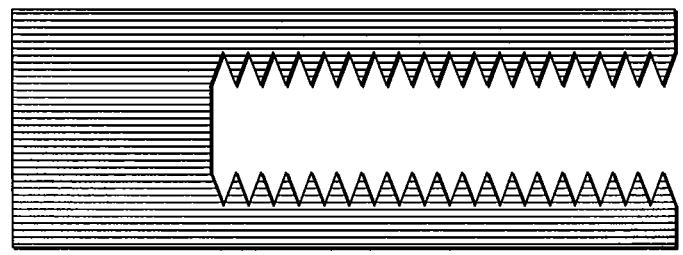
FIG. 1 is a schematic cross-sectional drawing of a female thread cut directly into the end of a uni-axial composite material.
Figure 2:
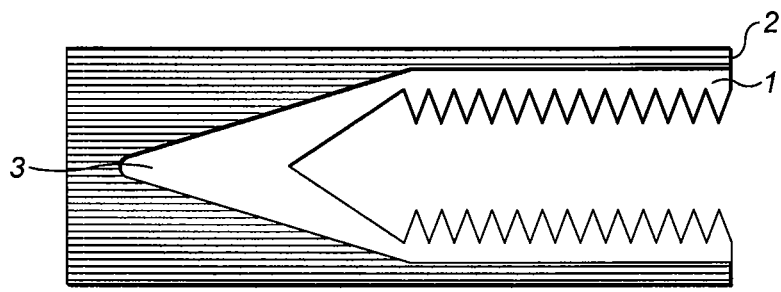
FIG. 2 is a schematic cross-sectional drawing of a prior art metallic insert bonded into the end of a uni-axial composite material.
Figures 3A, 3B, 3C:
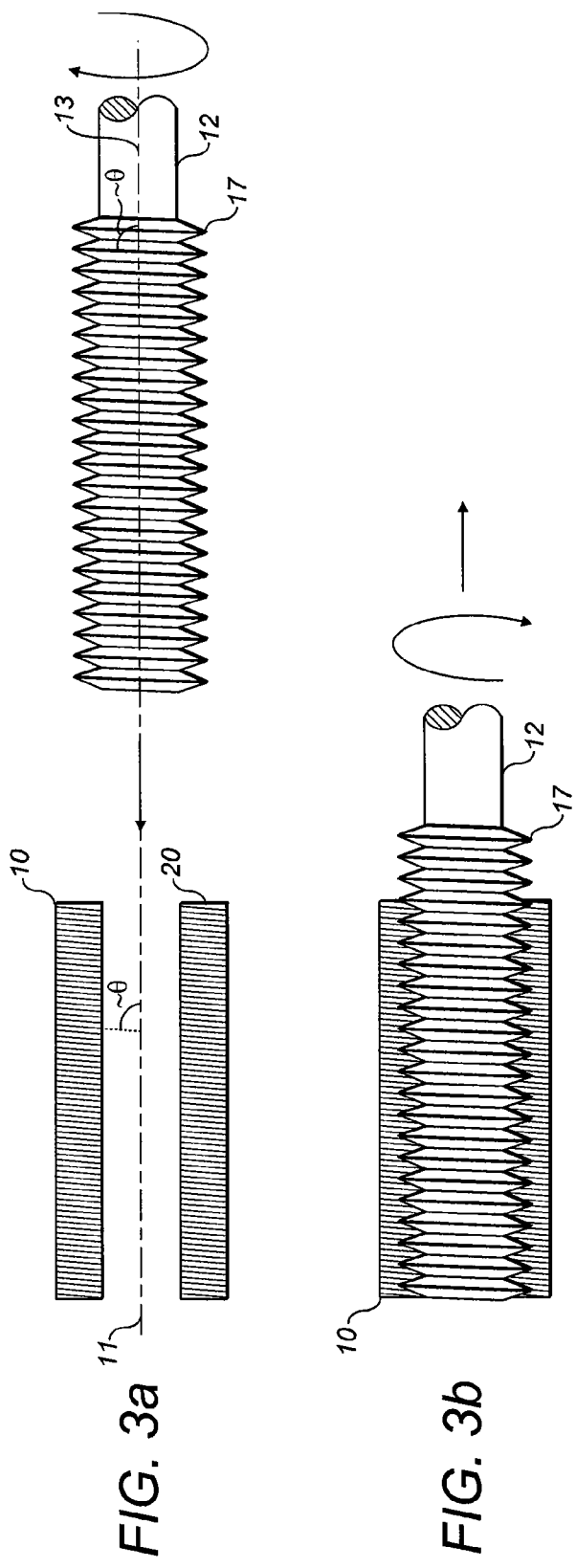
FIG. 3a is a schematic cross-sectional drawing of a filament wound composite tube and a schematic drawing of a female thread cutting tool before a thread cutting operation.
FIG. 3b shows the components of FIG. 3a during the thread cutting operation.
FIG. 3c shows the components of FIG. 3a after the thread cutting operation is complete.

For clarity, the winding angle of the fibres 20 is the acute angle that the fibres 20 make with the major axis 11 of the tube 10 when the tube 10 is viewed from the side (FIG. 3a). Similarly, the thread angle of the thread cutting tool 12 is the acute angle that the threads 17 make with the major axis 13 of the thread cutting tool 12 when the thread cutting tool is viewed from the side (FIG. 3a). For the purposes of clarity in the Figures, only fibres 20 having a winding angle of approximately ±θ are illustrated in FIG. 3a. However, it will be understood that the tube 10 comprises fibres 20 having a winding angle of approximately ±θ.

In one example, the tube 10 may comprise standard e-glass and epoxy resin. However, any other suitable fibre composite material may be used such as e-glass and polyester or vinylester resin or carbon or aramid fibres.

FIG. 3b shows the filament wound fibre composite tube 10 during a thread tapping process. During the thread tapping process the thread cutting tool 12 is "screwed" into the tube 10 to cut a thread formation 25 in the interior surface of the tube 10. The thread cutting tool 12 is then removed (FIG. 3c). The resulting component is a threaded insert 30 which comprises sleeve 35, formed from the tube 10, having thread formation 25 on its interior surface. The threads 26 of the thread formation have a thread angle which is equal to the thread angle of the thread cutting tool 12 and which is therefore approximately equal to the winding angle of the fibres 20. In use, the insert 30 is bonded into the uni-axial material of the root end of a wind blade as will be described in greater detail below.

FIGS. 4a to 4c schematically illustrate the general principal of a second, alternative, method of fabricating an insert in accordance with the present invention. FIG. 4a shows a threaded mandrel 112 onto which layers 120 of fibres are positioned (FIG. 4b) to build up a sleeve 135. Because the mandrel 112 has a threaded formation 117 on its outer surface, the sleeve 135, which is built up on the threaded mandrel 112, also has a thread formation 125 on its interior surface. In a preferred method of fabrication, described in greater detail below with reference to FIGS. 5a to 5d, layers 220 of multi-axial fibre fabric are positioned on the mandrel and a uni-axial fibre tow 221 is wound over each layer of multi-axial fibre fabric in order to pull the multi-axial fibre fabric into the thread form on the mandrel. However, other methods, discussed below, of building up a sleeve 135 on a threaded mandrel may be used without departing from the present invention.

Once the sleeve 135 has been built up, by any appropriate means, on the threaded mandrel 112 it can be infused with resin, cured and removed from the threaded mandrel 112 to form a pre-cured insert 130. Alternatively the sleeve 135 may be supplied and installed whilst still mounted on the threaded mandrel without any resin having been infused. In this case the insert 130 is infused with resin and cured whilst in-situ as will be described in greater detail below.

Figure 5A:
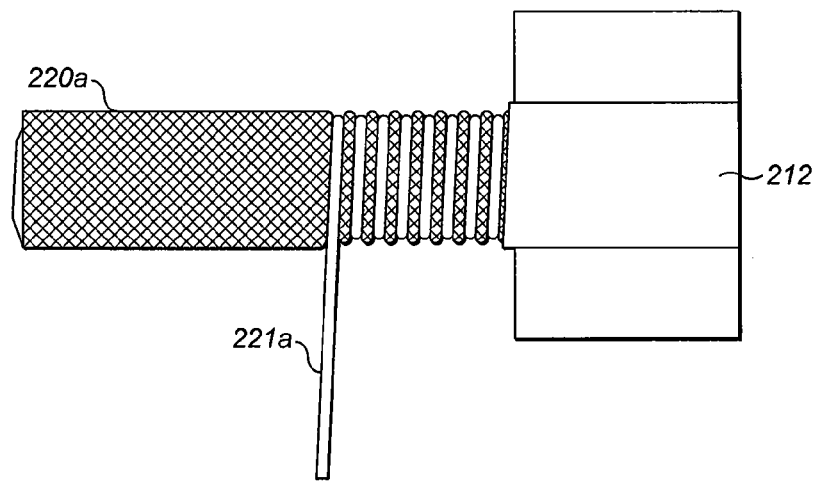
FIG. 5a is a drawing of the first stages of fabrication of an insert in accordance with the present invention.
Figure 5B:
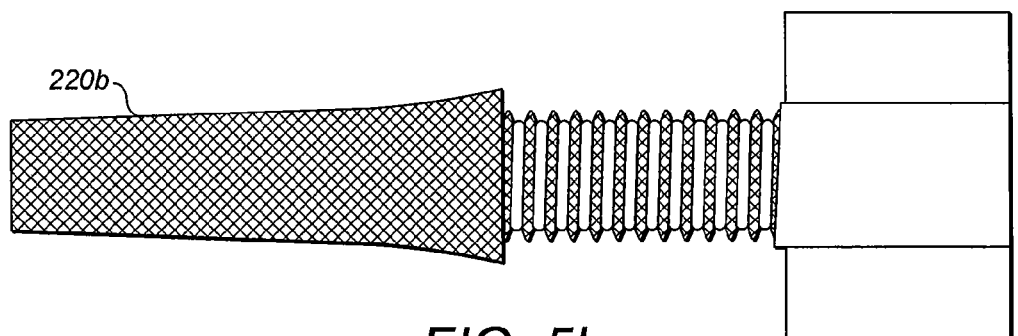
Figure 5C:
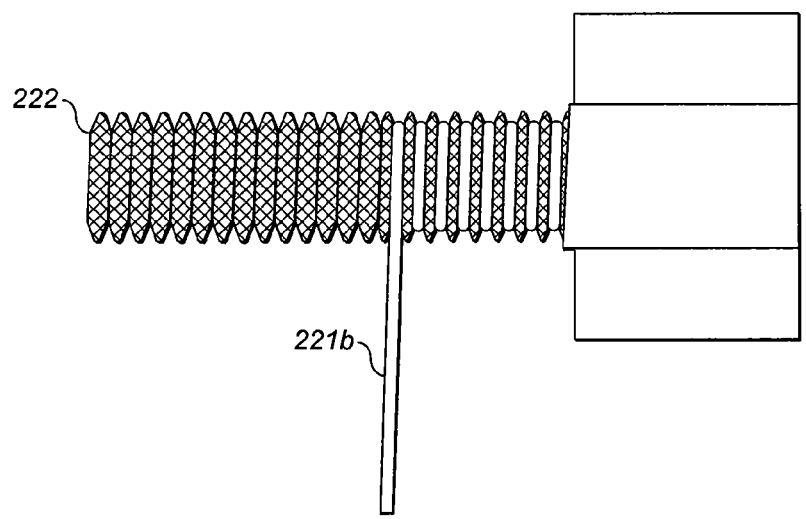

FIGS. 5a to 5c show a preferred method of fabricating an insert in accordance with the present invention. As shown in FIG. 5a, in a first process step a layer 220a of low tex (typically 3-24 k) multi-axial fibre fabric is positioned over a threaded mandrel 212. The multi-axial fibre fabric is preferably a fibre braid. However, a sheet fabric, or helically wound tape may also be used.

In a second process step, a uni-axial low tex fibre tow, comprising a plurality of uni-axial fibres, is wound over the multi-axial fibre fabric layer 220a to form a helically wound fibre layer 221a. As can be seen in FIG. 5a, the uni-axial fibre tow is wound onto the mandrel 212 so that it lies within the grooves of the thread formation on the mandrel. This pulls the layer 220a of multi-axial fibre fabric into the thread formation and helps to ensure that the thread formation on the finished insert is a true "mould" of the thread formation in the threaded mandrel 212. Thus the fibres of the helically wound fibre layer are substantially aligned with a path defined by the crests 127 (FIG. 4c) of the thread formation on the interior surface of the sleeve 235. As can be seen from FIG. 5a, the helically wound fibre layer 221a is not continuous in the axial direction such that it does not totally cover the multi-axial fibre fabric layer below.

Figure 5D:
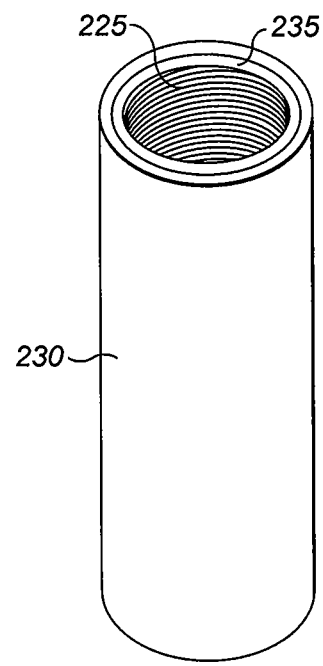

FIG. 5b shows a third process step in which a second layer 220b of multi-axial fibre fabric is positioned over the mandrel 212. In a fourth process step, shown in FIG. 5c, an optional guide thread 222 is wound over the second layer 220b of multi-axial fibre fabric in order to pull the second layer 220b of multi-axial fibre fabric into the form of the threaded mandrel 212. The guide thread 222 is then overwound by a second helically wound fibre layer 221b. This process is repeated 4 or 5 times until the threads of the threaded mandrel 212 are completely filled by the fibre laminate structure which form a sleeve 235. In one example, the sleeve 235 is impregnated with resin and cured before being removed from the threaded mandrel, by unscrewing, to produce a pre-cured insert 230 (FIG. 5d). In an alternative example, described below, the insert 230 is supplied and installed whilst still mounted on the threaded mandrel without any resin having been infused.

As mentioned above, the preferred method of building up the sleeve 135, 235 of the insert 130, 230 on a threaded mandrel is as described with reference to FIGS. 5a to 5c. However, other methods of building up a fibre sleeve on a threaded mandrel may also be used. For example, only one layer of multi-axial fibre fabric may be used, said layer being overlaid with layers of wound uni-axial fibres and/or filament wound layers. Alternatively, the sleeve may be built up only of multi-axial fibre layers. In such a case a vacuum bag, or external female mandrel, may be used to ensure that the fibre layers properly lie within the thread formation of the threaded mandrel.

In a further alternative method, a fibre composite tube made up of layers of multi-axial fibre fabric, wound uni-axial fibre and filament wound fibres, or any combination thereof, laid-up on a plane cylindrical mandrel. In this case the sleeve is infused with resin and cured before being removed from the mandrel and threaded with a thread cutting tool such as is shown in FIGS. 3a to 3c.

Figure 8:
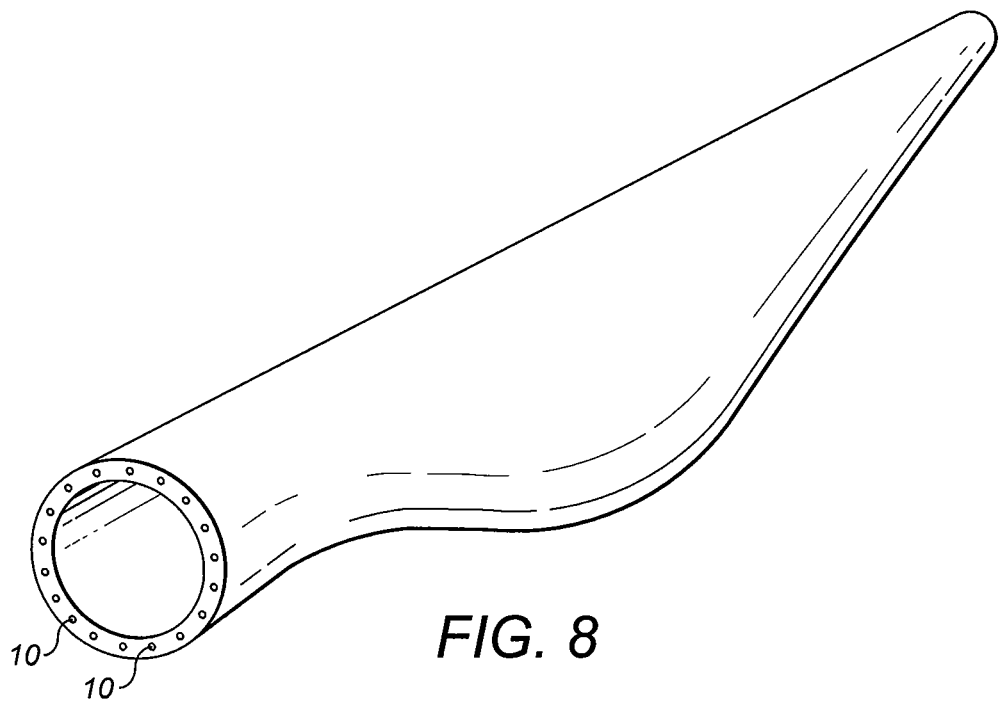
FIG. 8 is a drawing of a wind turbine blade with inserts embedded within a root of the wind turbine blade.

The pre-cured inserts, when made by any method, may be installed into the uni-axial composite material of the root of a wind blade (see FIG. 8) in two ways. In the first method a hole is drilled in the root end and the insert is bonded into the hole with adhesive. In an alternative method, the pre-cured insert may be positioned in the uni-axial material of the root during lay-up. The root is then infused with resin and cured to secure the insert in place.

For inserts comprising no resin, the insert is positioned in the uni-axial material of the root during lay-up whilst still supported on the mandrel. The root and insert are then infused with resin together in the same process step and cured. The mandrel may then be removed.

Figure 6:
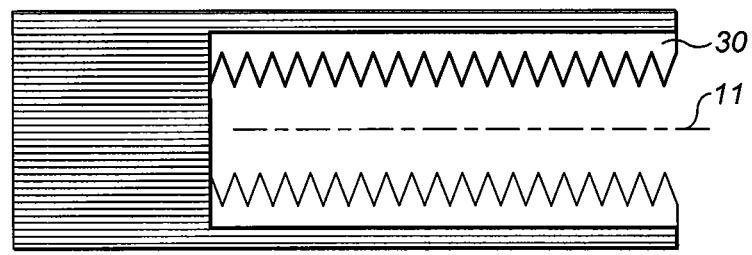
FIG. 6 is a schematic cross-sectional drawing of an insert according to the present invention bonded into the end of a uni-axial composite material.

FIG. 6 illustrates an insert, when made/installed by any method, positioned in a uni-axial composite material. As shown, the insert is installed so that its major axis 11 is substantially parallel to the direction of the uni-axial fibres.

Figure 7:
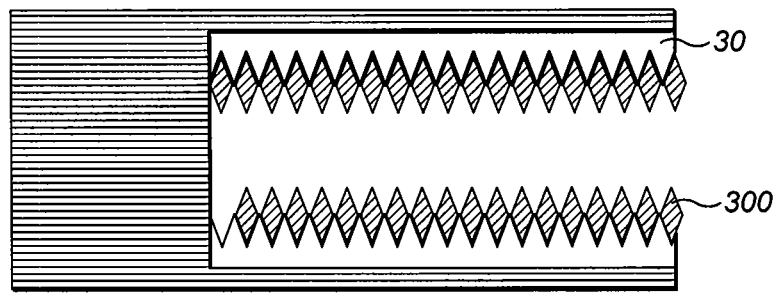
FIG. 7 is a schematic cross-sectional drawing of the insert of FIG. 6 with a thread insert.

In practice, it is preferable that the thread of the insert be re-useable to allow connecting bolts to be installed/removed a number of times for service and maintenance. In order to improve the re-usability of the inserts, a metallic thread insert 300 (FIG. 7) is located within the thread formation on the interior surface of the sleeve. The thread insert 300 initially has a diameter which is slightly larger than the thread formation in the composite insert so that when it is screwed into the thread formation the insert is compressed and held in place by an interference fit.

It is not necessary for the whole of the interior surface of the insert to comprise a thread formation. In one example (not shown) the thread formation exists only at one end of the insert. Such an embodiment may be useful when it is desired to increase the bond area provided on the external surface of the insert.

Although the insert of the present invention has been described with reference to installation within the uni-axial material of the root of a wind blade, it will be appreciated that the insert may also be used in other areas of technology where bolted connections need to be made. Similarly, it will be understood that the insert may be installed in non-uni-axial composite materials or other types of material.

While the foregoing is directed to embodiments of the present invention, other and further embodiments of the invention may be devised without departing from the basic scope thereof, and the scope thereof is determined by the claims that follow.

The invention claimed is:

1. An end connection comprising:
   a uni-axial composite material; and
   at least one insert for forming an end connection in the uni-axial composite material, the at least one insert comprising a sleeve, wherein the sleeve comprises a plurality of fibres having a multi-axial arrangement, wherein at least a portion of the interior surface of the sleeve comprises a thread formation, the at least one insert being embedded within the uni-axial composite material.

2. The end connection according to claim 1 wherein the sleeve comprises at least one layer of multi-axial fibre fabric.

3. The end connection according to claim 2 wherein the sleeve comprises a plurality of layers of multi-axial fibre fabric.

4. The end connection according to claim 2 wherein the sleeve further comprises at least one helically wound fibre layer.

5. The end connection according to claim 4 wherein the sleeve comprises a plurality of helically wound fibre layers.

6. The end connection according to claim 4 wherein the or each helically wound fibre layer overlies a layer of multi-axial fibre fabric.

7. The end connection according to claim 6 wherein the fibres of the or each helically wound fibre layer are substantially aligned with a path defined by crests of the thread formation.

8. The end connection according to claim 1 wherein the sleeve comprises a fibre reinforced plastic.

9. The end connection according to claim 8 wherein the sleeve comprises a filament wound fibre composite tube.

10. The end connection according to claim 9 wherein the winding angle of 90% of the fibres is substantially equal to $\pm\theta$, where $\theta$ is the thread angle of the thread formation.

11. The end connection according to claim 1 wherein the fibres are embedded within a cured resin matrix.

12. The end connection according to claim 1 wherein the thread formation is integrally formed with the sleeve.

13. The end connection according to claim 12, wherein the thread formation is a cut thread formation.

14. The end connection according to claim 1 further comprising a helical thread insert located within the thread formation.

15. A wind turbine blade comprising
    a plurality of inserts embedded within a root of the wind turbine blade, each insert comprising a sleeve, wherein the sleeve comprises a plurality of fibres having a multi-axial arrangement, wherein at least a portion of the interior surface of the sleeve comprises a thread formation.

16. The blade according to claim 15, further comprising a helical thread insert located within the thread formation and remains in situ during operation.

17. The blade according to claim 15, wherein the sleeve comprises at least one layer of multi-axial fibre fabric.

18. The blade according to claim 17, wherein the sleeve comprises a plurality of layers of multi-axial fibre fabric.

19. The blade according to claim 17, wherein the sleeve further comprises at least one helically wound fibre layer.

20. The blade according to claim 19, wherein the sleeve comprises a plurality of helically wound fibre layers.

21. The blade according to claim 19, wherein the or each helically wound fibre layer overlies a layer of multi-axial fibre fabric.

22. The blade according to claim 21, wherein the fibres of the or each helically wound fibre layer are substantially aligned with a path defined by crests of the thread formation.

23. The blade according to claim 15, wherein the sleeve comprises a fibre reinforced plastic.

24. The blade according to claim 23, wherein the sleeve comprises a filament wound fibre composite tube.

25. The blade according to claim 24, wherein the winding angle of 90% of the fibres is substantially equal to $\pm\theta$, where $\theta$ is the thread angle of the thread formation.

26. The blade according to claim 15, wherein the fibres are embedded within a cured resin matrix.

27. The blade according to claim 15, wherein the thread formation is integrally formed with the sleeve.

28. The blade according to claim 27, wherein the thread formation is a cut thread formation.

* * * * *